US009016463B2

(12) United States Patent
Mimoto et al.

(10) Patent No.: US 9,016,463 B2
(45) Date of Patent: Apr. 28, 2015

(54) CONVEYING DEVICE

(71) Applicant: Brother Kogyo Kabushiki Kaisha, Nagoya-shi, Aichi-ken (JP)

(72) Inventors: Masao Mimoto, Nagoya (JP); Shota Iijima, Nagoya (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 14/289,804

(22) Filed: May 29, 2014

(65) Prior Publication Data

US 2015/0090561 A1 Apr. 2, 2015

(30) Foreign Application Priority Data

Sep. 30, 2013 (JP) ................................ 2013-205991

(51) Int. Cl.
*B65H 5/36* (2006.01)
*B65G 13/02* (2006.01)
*B41J 11/20* (2006.01)

(52) U.S. Cl.
CPC ................ *B65G 13/02* (2013.01); *B41J 11/20* (2013.01); *B65H 5/36* (2013.01)

(58) Field of Classification Search
USPC .......... 198/624; 271/9.02, 9.09, 10.11, 10.08, 271/273, 274; 400/56, 58, 642; 347/8, 104
See application file for complete search history.

(56) References Cited

U.S. PATENT DOCUMENTS

| | | | | |
|---|---|---|---|---|
| 8,517,371 | B2 * | 8/2013 | Horade | 271/10.11 |
| 8,641,303 | B2 | 2/2014 | Sano et al. | |
| 8,770,572 | B2 * | 7/2014 | Uchino | 271/9.09 |
| 2008/0278523 | A1 * | 11/2008 | Uchida | 346/134 |
| 2011/0188916 | A1 | 8/2011 | Sano et al. | |
| 2011/0236118 | A1 * | 9/2011 | Ota et al. | 400/642 |
| 2012/0188320 | A1 * | 7/2012 | Iijima et al. | 347/104 |
| 2013/0256976 | A1 * | 10/2013 | Samoto et al. | 271/10.11 |
| 2014/0063162 | A1 * | 3/2014 | Iijima | 347/104 |
| 2014/0092186 | A1 * | 4/2014 | Iijima | 347/104 |

FOREIGN PATENT DOCUMENTS

JP 2011-157176 A 8/2011

* cited by examiner

*Primary Examiner* — Mark A Deuble
(74) *Attorney, Agent, or Firm* — Merchant & Gould PC

(57) ABSTRACT

A conveying device includes: opposed first and second rollers disposed to a first path; a roller holder supporting the second roller and movable between a first position where the second roller contacts the first roller and a second position where the second roller is spaced apart from the first roller; and opposed first and second guide members defining a second path merged with the first path. The first guide member is movable between a third position where the first guide member is spaced apart from the second guide member at a predetermined distance and a fourth position where their distance is less than the predetermined distance. The first guide member includes a guide portion for contacting and moving the roller holder from the first position to the second position in response to movement of the first guide member from the third position to the fourth position.

10 Claims, 11 Drawing Sheets

CONVEYING DEVICE

CROSS REFERENCE TO RELATED APPLICATION

The present application claims priority from Japanese Patent Application No. 2013-205991, which was filed on Sep. 30, 2013, the disclosure of which is herein incorporated by reference in its entirety.

BACKGROUND OF THE INVENTION

1. Field of the Invention

The present invention relates to a conveying device including roller pairs to convey a sheet.

2. Description of the Related Art

Some conveying devices can convey not only a sheet but also a rigid medium such as a CD and a DVD. In conveyance, such a rigid medium is typically placed on a tray specific to the rigid medium. The tray is inserted from an insertion opening and conveyed in the conveying device in a state in which the tray is supported on a tray guide provided in the conveying device.

The conveying device as described above includes a pair of rollers movable toward and away from each other. In conveyance of the sheet, the pair of rollers are held in contact with each other. In conveyance of the tray supporting the rigid medium thereon, on the other hand, the pair of rollers are spaced apart from each other.

In some conveying devices, a path for conveying a sheet is branched. For example, some image recording apparatuses, usually including a conveying device, can record images on both sides of a sheet. Such an image recording apparatus, for example, has: a main path through which a sheet is conveyed for image recording thereon by a recording unit; and a resupply path which is branched off from the main path and through which the sheet printed on its front side by the image recording is conveyed to the recording unit again. There is known an image recording apparatus having a resupply path and a pair of rollers movable toward and away from each other.

SUMMARY OF THE INVENTION

This invention has been developed to provide a conveying device capable of conveying not only a sheet but also a rigid medium and reducing increase in size of the conveying device.

The present invention provides a conveying device, comprising: a first roller disposed to a first conveyance path; at least one second roller disposed to the first conveyance path and opposed to the first roller; at least one roller holder supporting the at least one second roller and movable between a first position at which the at least one second roller is in contact with the first roller and a second position at which the at least one second roller is spaced apart from the first roller; a first guide member comprising a guide face defining a part of a second conveyance path merged with the first conveyance path; and a second guide member opposed to the first guide member and comprising another guide face defining a part of the second conveyance path, wherein the first guide member is movable between a third position at which the first guide member is spaced apart from the second guide member at a predetermined distance and a fourth position at which a distance between the first guide member and the second guide member is less than the predetermined distance, the first guide member comprising a guide portion configured to contact the at least one roller holder to move the at least one roller holder from the first position to the second position in response to movement of the first guide member from the third position to the fourth position.

According to the present invention, it is possible to reduce increase in size of a conveying device capable of conveying not only a sheet but also a rigid medium.

BRIEF DESCRIPTION OF THE DRAWINGS

The objects, features, advantages, and technical and industrial significance of the present invention will be better understood by reading the following detailed description of the embodiment of the invention, when considered in connection with the accompanying drawings, in which:

FIGS. 1A and 1B are perspective views of an MFP according to one embodiment of the present invention, wherein FIG. 1A is a perspective view of the MFP, with a lever located at a fifth position, and FIG. 1B is a perspective view of the MFP 10, with the lever located at a sixth position and a media tray inserted;

FIGS. 3A and 3B are elevational views in vertical cross section schematically illustrating components around guide portions of a lever, wherein FIG. 3A illustrates a state in which the lever is located at the fifth position, and FIG. 3B illustrates a state in which the lever is located at the sixth position;

FIGS. 5A and 5B are cross-sectional views illustrating components around the conveyor roller pair, wherein FIG. 5A illustrates a state in which pinch rollers are held in contact with a conveyor roller, and FIG. 5B illustrates a state in which the pinch rollers are spaced apart from the conveyor roller;

DETAILED DESCRIPTION OF THE EMBODIMENT

Hereinafter, there will be described one embodiment of the present invention by reference to the drawings. It is to be understood that the following embodiment is described only by way of example, and the invention may be otherwise embodied with various modifications without departing from the scope and spirit of the invention. A multi-function peripheral (MFP) 10 is used in a state illustrated in FIG. 1. In the present embodiment, three arrows illustrated in FIG. 1 indicate an up and down direction 7, a front and rear direction 8, and a right and left direction 9. In the following explanation, the up and down direction 7 is defined as an up and down direction of the MFP 10 illustrated in FIG. 1, i.e., the MFP 10 being in a normal state. Also, the front and rear direction 8 is defined by regarding a side of the MFP 10 on which an opening 13 is formed as a front side, and the right and left direction 9 is defined in a state in which the MFP 10 is viewed from the front side.

Overall Construction of MFP 10

Figure 1A:
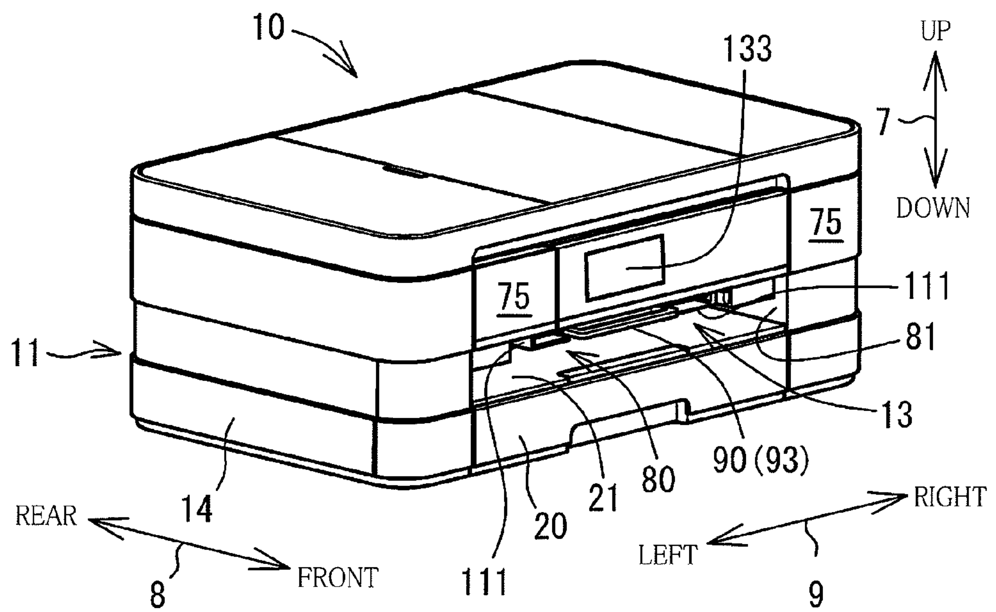
Figure 1B:
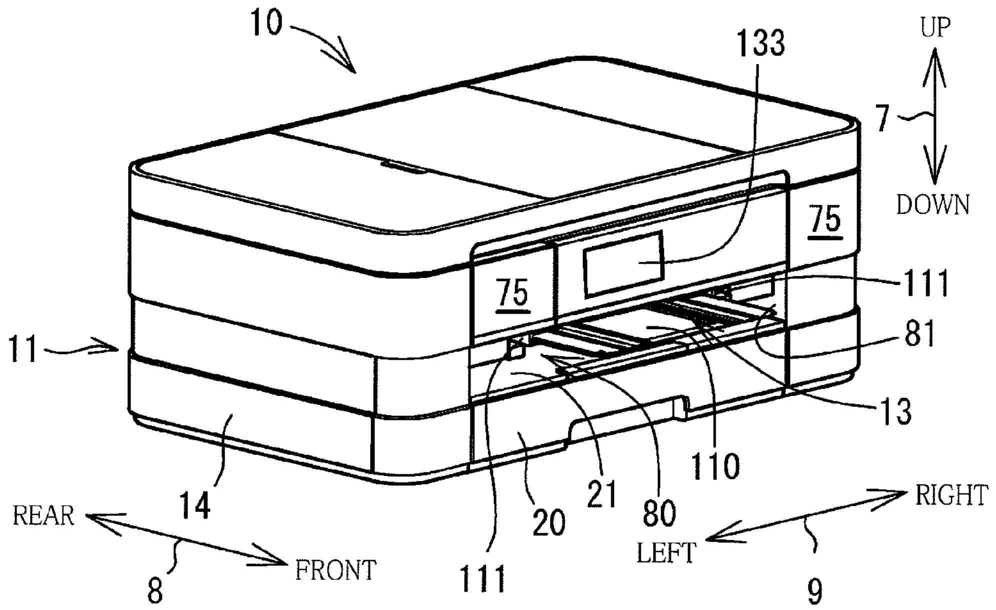
Figure 11:
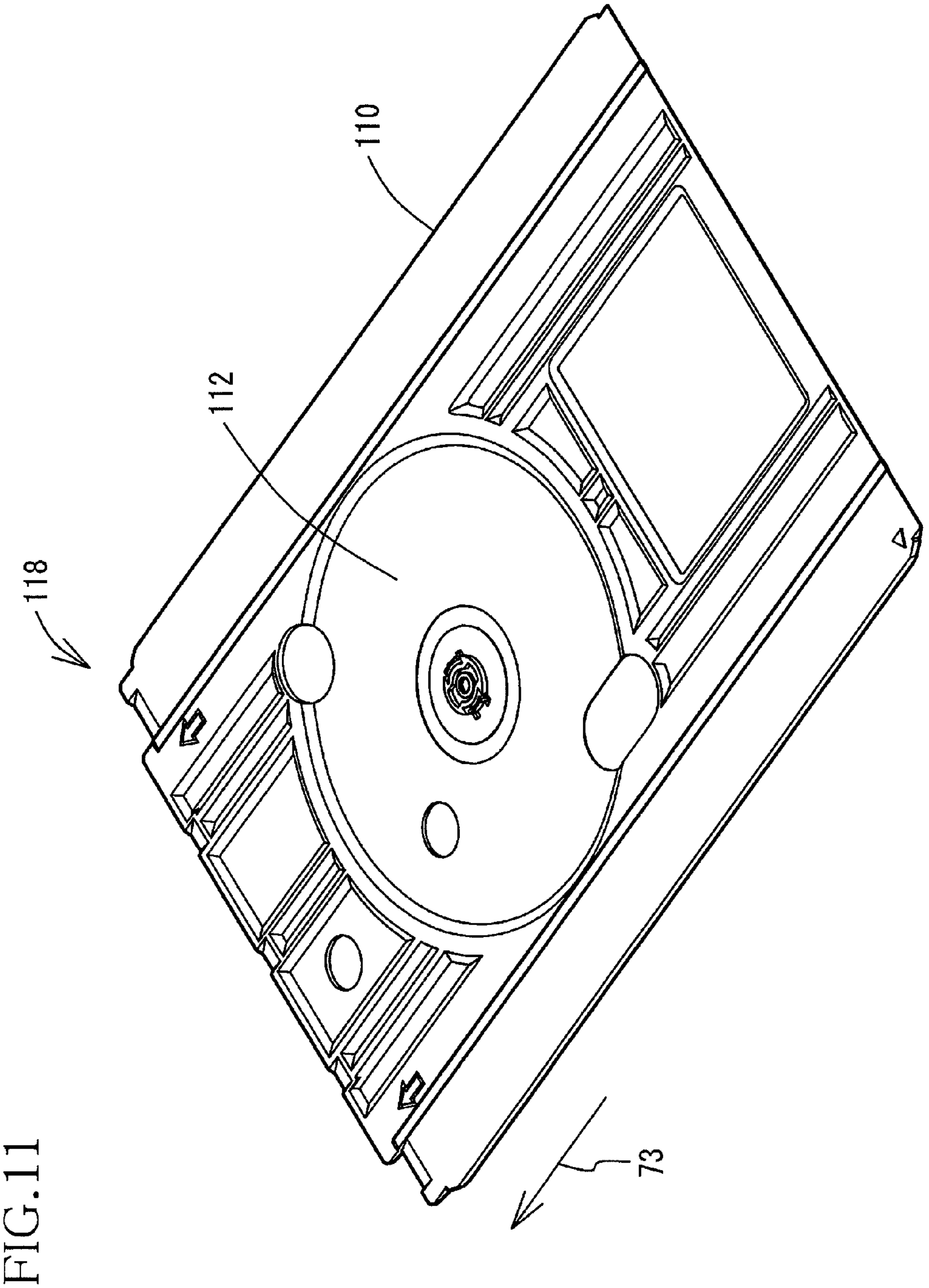
FIG. 11 is a perspective view illustrating the media tray viewed from an upper side thereof.

As illustrated in FIG. 1, the MFP 10 is of a slim type having a generally rectangular parallelepiped shape. A printing section 11 as one example of a conveying device according to the present invention is provided in a lower portion of the MFP 10. The MFP 10 has various functions such as a facsimile function and a printing function. One example of the printing function of the MFP 10 is a function for ejecting ink to record images on both sides of a recording sheet 12 (see FIG. 2). It is noted that the MFP 10 uses various recording techniques other than the ink-jet technique, for example, the MFP 10 may use electronic photography to record images. The MFP 10 also has a function for recording an image on a face of a storage medium, not shown, such as a CD-ROM and a DVD-ROM supported on a media tray 110 (see FIGS. 1B, 2, and 11) which will be described below. This function will be explained later.

Supply Tray 20

Figure 2:
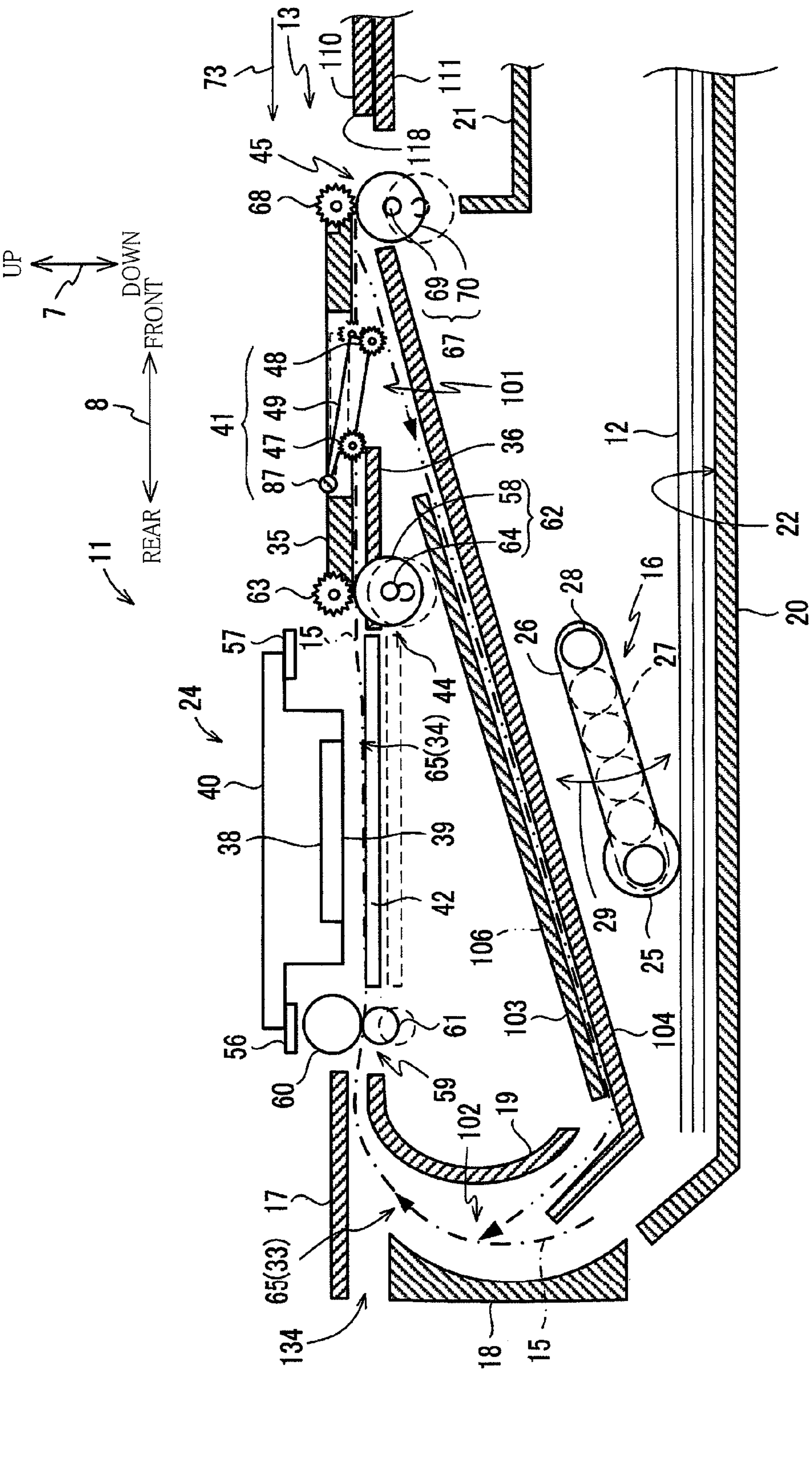
FIG. 2 is an elevational view in vertical cross section schematically illustrating an internal structure of a printing section.

As illustrated in FIG. 1, the printing section 11 includes a housing 14 having a front face 75 formed with the opening 13. A front portion of the housing 14 has a recessed portion 80 which is recessed rearward from the front face 75 through the opening 13. A supply tray 20 is insertable and removable into and from a lower portion of the recessed portion 80 in the front and rear direction 8. The supply tray 20 is shaped like a box opening upward. As illustrated in FIG. 2, a plurality of recording sheets 12 can be supported on a bottom plate 22 of the supply tray 20. An output tray 21 is supported above and in front of the supply tray 20. The output tray 21 is moved together with the supply tray 20 in the front and rear direction 8. An upper surface of the output tray 21 can support the recording sheet 12 printed by a recording unit 24 which will be described below and discharged onto the recessed portion 80.

Supply Unit 16

As illustrated in FIG. 2, a supply unit 16 is provided directly above the bottom plate 22 of the supply tray 20 fitted in the recessed portion 80. The supply unit 16 includes a supply roller 25, a supply arm 26, and a drive-power transmitting mechanism 27. The supply roller 25 is supported at its shaft by a distal end portion of the supply arm 26. The supply arm 26 can pivot about a support shaft 28 provided on a proximal end portion of the supply arm 26 in a direction indicated by arrow 29. The pivotal movement of the supply arm 26 moves the supply roller 25 to and away from the bottom plate 22 of the supply tray 20 or an uppermost one of the recording sheets 12 stacked on the supply tray 20.

The supply roller 25 is rotated by driving power produced by a conveyor motor, not shown, which is transmitted by the drive-power transmitting mechanism 27 including a plurality of gears. When the supply roller 25 is rotated in a state in which the supply roller 25 is held in contact with an uppermost one of the recording sheets 12 stacked on the bottom plate 22 of the supply tray 20, the uppermost sheet 12 is supplied to a conveyance path 65 which will be described below. It is noted that the supply roller 25 may be rotated by driving power supplied from a motor which is provided separately from the conveyor motor.

Conveyance Path 65

In the housing 14, as illustrated in FIG. 2, the conveyance path 65 is defined to extend from a rear end portion of the supply tray 20. The conveyance path 65 includes a curved portion 33 and a straight portion 34 as one example of a first conveyance path. The curved portion 33 is curved upward from the rear end portion of the supply tray 20 and connected to the straight portion 34 at a rear of a conveyor roller pair 59 which will be described below. The straight portion 34 extends in the front and rear direction 8 from an opening 134 formed in a rear face of the printing section 11, to a reversible roller pair 45 which will be described below.

The curved portion 33 is defined by an outer guide member 18 and an inner guide member 19 which are opposed to each other at a predetermined distance. The straight portion 34 is defined, in an area in which the recording unit 24 is disposed, by the recording unit 24 and a platen 42 which are opposed to each other at a predetermined distance. The straight portion 34 is defined at a rear of the recording unit 24 by a first upper guide member 17 and the outer guide member 18. The straight portion 34 is defined in front of the recording unit 24 by a second upper guide member 35 and a first lower guide member 36.

The recording sheet 12 supported by the supply tray 20 is supplied to the curved portion 33 by the supply roller 25 and conveyed through the curved portion 33 and the straight portion 34 in a conveying direction 15 indicated by the dot-dash arrow in FIG. 2. The media tray 110 is inserted into the straight portion 34 from the opening 13 and conveyed along the straight portion 34 in the front and rear direction 8.

Recording Unit 24

As illustrated in FIG. 2, the recording unit 24 is provided over the straight portion 34. The platen 42 is provided under the recording unit 24 so as to be opposed to the recording unit 24. The platen 42 is shaped like a planar plate which is longer in the front and rear direction 8 and in the right and left direction 9 than in the up and down direction 7. The platen 42 supports the recording sheet 12.

As illustrated in FIG. 2, the recording unit 24 includes a carriage 40 and a recording head 38. The carriage 40 is supported by two guide rails 56, 57 arranged so as to be spaced apart from each other in the front and rear direction 8. The carriage 40 can be reciprocated in the right and left direction 9 on these guide rails 56, 57. The recording head 38 is mounted on the carriage 40. Ink is supplied to the recording head 38 from an ink cartridge, not shown. A lower surface of the recording head 38 has nozzles 39 formed therein. While the carriage 40 is being moved in the right and left direction 9, the recording head 38 ejects ink droplets from the nozzles 39 toward the platen 42 to form an image on the recording sheet 12 conveyed in the conveying direction 15 and supported on the platen 42 or the storage medium supported on the media tray 110.

Media Tray 110

As described above, the MFP 10 has the function for recording an image on a face of the storage medium. In a case where an image is recorded on the storage medium, the storage medium is supported by the media tray 110 illustrated in FIG. 11. The media tray 110 is a thin resin plate whose upper surface has a support region 112 at its central portion in the right and left direction 9. The support region 112 is a round recess formed in the upper surface. To support the storage medium, the support region 112 is generally similar in size and shape to the storage medium to be placed.

As illustrated in FIGS. 1B and 2, the media tray 110 is inserted from the opening 13 into the straight portion 34 in a direction opposite to the conveying direction 15, i.e., a rear direction indicated by arrow 73. The media tray 110 inserted into the straight portion 34 is nipped by the conveyor roller pair 59 and an output roller pair 44 each being in a second state and conveyed through the straight portion 34 in the front and rear direction 8. As in the case of the recording sheet 12, the recording unit 24 ejects ink droplets onto the storage medium placed on the media tray 110 being conveyed through a position just under the recording unit 24. As a result, an image is recorded on the storage medium.

Conveyor Roller Pair 59, Output Roller Pair 44, and Reversible Roller Pair 45

As illustrated in FIG. 2, the conveyor roller pair 59 is disposed upstream of the recording unit 24 and the platen 42 in the conveying direction 15 in the straight portion 34. The output roller pair 44 is disposed downstream of the recording unit 24 in the conveying direction 15 in the straight portion 34. The reversible roller pair 45 is disposed downstream of the output roller pair 44 in the conveying direction 15 in the straight portion 34.

Figure 4A:
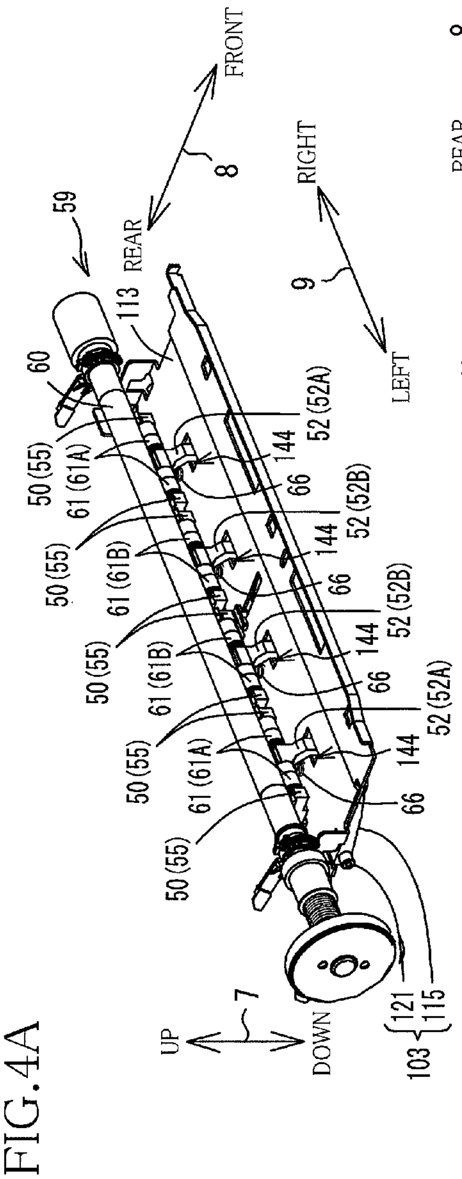
FIGS. 4A and 4B are perspective views illustrating components around a conveyor roller pair, with a frame illustrated in FIG. 4A and not illustrated in FIG. 4B.
Figure 4B:
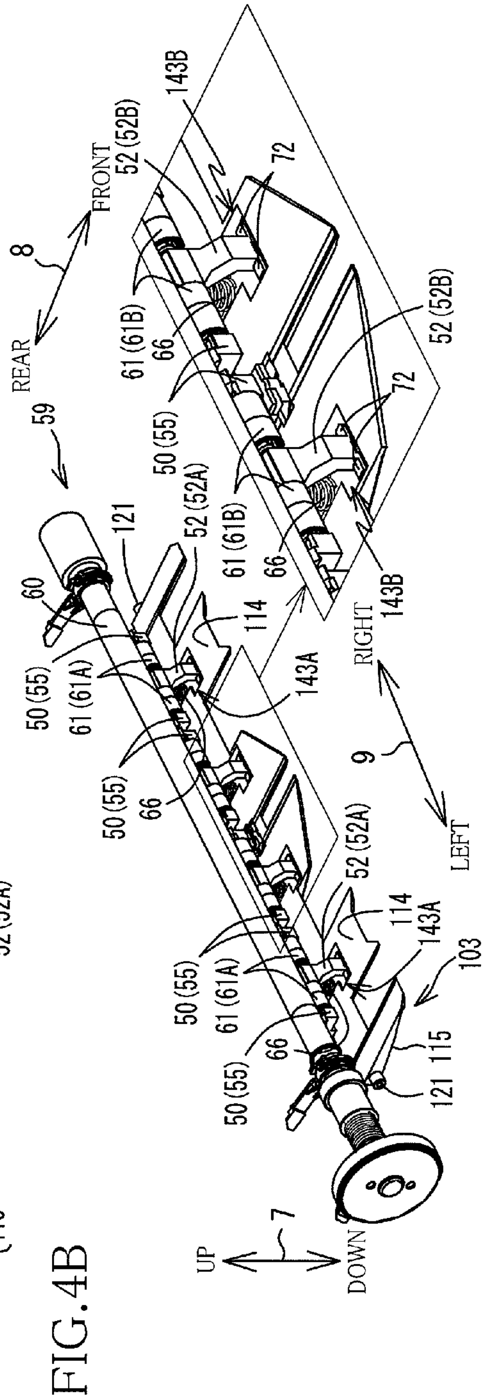

As illustrated in FIGS. 2, 4A, and 4B, the conveyor roller pair 59 includes (i) a conveyor roller 60 as one example of a first roller disposed partly in an upper portion of the straight portion 34 and (ii) pinch rollers 61 each as one example of a second roller disposed partly in a lower portion the straight portion 34 so as to be opposed to the conveyor roller 60. The conveyor roller 60 is a circular cylindrical component extending in the right and left direction 9 and rotatable about an axis extending in the right and left direction 9. The pinch rollers 61 are spaced apart from each other in the right and left direction 9 and rotatable about an axis extending in the right and left direction 9. A moving mechanism 50 which will be described below respectively include supporters 55 (each as one example of a roller holder) arranged spaced apart from each other in the right and left direction 9, and each pair of pinch rollers 61 is rotatably supported by a corresponding one of the supporters 55.

Figure 5A:
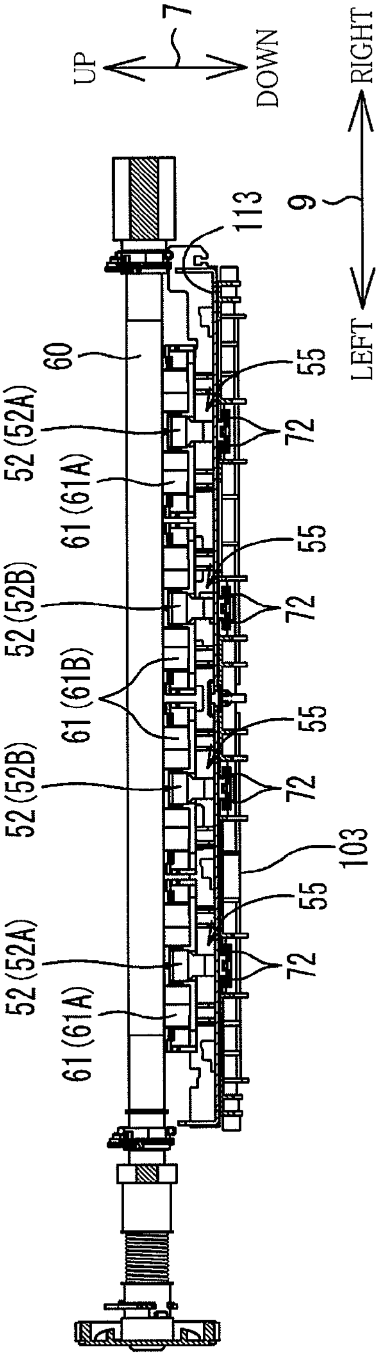

Each of the supporters 55 is movable in the up and down direction 7 between a first position illustrated in FIG. 5A and a second position illustrated in FIG. 5B and located below the first position. The moving mechanism 50 includes elastic members 66 illustrated in FIGS. 4A and 4B each as one example of an urging member, and each of the supporters 55 is urged toward the conveyor roller 60 by a corresponding one of the elastic members 66. As illustrated in FIGS. 4A and 4B, each elastic member 66 is in the form of a coil spring and has an upper end mounted on the corresponding supporter 55 and a lower end mounted on a metal frame 113 provided below the pinch rollers 61 and the supporters 55. That is, the metal frame 113 supports the supporters 55 via the respective elastic members 66. The metal frame 113 is one of a plurality of frames constituting the housing 14.

In the above-described construction, the pinch rollers 61 are urged by the respective elastic members 66 toward the conveyor roller 60 and pressed against the conveyor roller 60. While four pairs of the pinch rollers 61, i.e., the eight pinch rollers 61 are provided in the present embodiment, the number of the pinch rollers 61 is not limited to eight.

As illustrated in FIG. 2, the output roller pair 44 includes (i) an output roller 62 disposed partly in a lower portion of the straight portion 34 and (ii) spurs 63 disposed partly in an upper portion of the straight portion 34 so as to be opposed to the output roller 62. The output roller 62 includes a shaft 64 extending in the right and left direction 9 and roller portions 58 mounted on the shaft 64 so as to be spaced apart from each other in the right and left direction 9. The spurs 63 are also spaced apart from each other in the right and left direction 9 so as to be opposed to the respective roller portions 58. The output roller 62 is urged by elastic members, not shown, toward the spurs 63.

As illustrated in FIG. 2, the reversible roller pair 45 includes (i) a reversible roller 67 disposed partly in a lower portion of the straight portion 34 and (ii) spurs 68 disposed partly in an upper portion of the straight portion 34 so as to be opposed to the reversible roller 67. The reversible roller 67 includes a shaft 69 extending in the right and left direction 9 and roller portions 70 mounted on the shaft 69 so as to be spaced apart from each other in the right and left direction 9. The spurs 68 are also spaced apart from each other in the right and left direction 9 so as to be opposed to the respective roller portions 70. The reversible roller 67 is urged by elastic members, not shown, toward the spurs 68.

Each of the conveyor roller pair 59 and the output roller pair 44 can nip the recording sheet 12 or the media tray 110 as will be described below. The reversible roller pair 45, in contrast, can nip the recording sheet 12 but cannot nip the media tray 110 as will be described below. Each of the conveyor roller 60, the output roller 62, and the reversible roller 67 is rotated forwardly by forward-rotation driving power produced by the conveyor motor, not shown, and rotated reversely by reverse-rotation driving power produced by the conveyor motor.

When the conveyor roller 60 is rotated forwardly in a state in which the recording sheet 12 or the media tray 110 is nipped by the conveyor roller pair 59, the recording sheet 12 or the media tray 110 is conveyed by the conveyor roller pair 59 through the straight portion 34 in the conveying direction 15, i.e., the front direction. When the conveyor roller 60 is rotated reversely in that state, the recording sheet 12 or the media tray 110 is conveyed by the conveyor roller pair 59 through the straight portion 34 in the direction opposite to the conveying direction 15, i.e., the rear direction.

When the output roller 62 is rotated forwardly in a state in which the recording sheet 12 or the media tray 110 is nipped by the output roller pair 44, the recording sheet 12 or the media tray 110 is conveyed by the output roller pair 44 through the straight portion 34 in the conveying direction 15, i.e., the front direction. When the output roller 62 is rotated reversely in that state, the recording sheet 12 or the media tray 110 is conveyed by the output roller pair 44 through the straight portion 34 in the direction opposite to the conveying direction 15, i.e., the rear direction.

When the reversible roller 67 is rotated forwardly in a state in which the recording sheet 12 is nipped by the reversible roller pair 45, the recording sheet 12 is conveyed by the reversible roller pair 45 through the straight portion 34 in the conveying direction 15, i.e., the front direction and discharged onto the output tray 21. When the reversible roller 67 is rotated reversely in that state, the recording sheet 12 is conveyed by the reversible roller pair 45 through the straight portion 34 in the direction opposite to the conveying direction 15, i.e., the rear direction.

Path Switcher 41

As illustrated in FIG. 2, a path switcher 41 is provided between the output roller pair 44 and the reversible roller pair 45 in the straight portion 34. The path switcher 41 includes auxiliary rollers 47, 48, a flap 49, and a shaft 87. The path switcher 41 is mounted on the second upper guide member 35.

The flap 49 extends from the shaft 87 generally in the conveying direction 15 and is pivotably supported by the shaft 87. The auxiliary rollers 47, 48 shaped like spurs are rotatably supported by the flap 49. The flap 49 is pivotable between a discharge state and a guide state. The discharge state is a state (indicated by the broken lines in FIG. 2) in which the flap 49 can guide the recording sheet 12 from the recording unit 24 to the reversible roller pair 45 via the output roller pair 44. The guide state is a state (indicated by the solid lines in FIG. 2) in which a distal end of the flap 49 is located at a lower position than in the discharge state, and the flap 49 can guide the recording sheet 12 conveyed in the direction opposite to the conveying direction 15, i.e., the rear direction, to a branched conveyance path 71 which will be described below.

In a standby state of the MFP 10, the flap 49 is in the guide state by its own weight. The flap 49 pivots to establish the discharge state when the flap 49 is raised by its contact with a leading edge of the recording sheet 12 printed on its front surface by the recording unit 24 and conveyed through the straight portion 34. When the recording sheet 12 is conveyed by the reversible roller 67 rotated forwardly and its trailing edge passes through the auxiliary roller 47, the flap 49 pivots by its own weight from the discharge state to the guide state. This pivotal movement lowers the trailing edge of the recording sheet 12 conveyed, so that the trailing edge of the recording sheet 12 points or faces to the branched conveyance path 71 which will be described below.

When the reversible roller 67 is further rotated forwardly in this state, the recording sheet 12 is conveyed by the reversible roller pair 45 in the conveying direction 15 i.e., the front direction and discharged onto the output tray 21. When the rotational direction of the reversible roller 67 is switched from the forward direction to the reverse direction, the reversible roller pair 45 conveys the recording sheet 12 in the direction opposite to the conveying direction 15 into the branched conveyance path 71. It is noted that the pivotal movement of the flap 49 may be caused by any method other than the above-described method. For example, the pivotal movement of the flap 49 may be caused by driving power produced by a flap-pivot motor, not shown.

Branched Conveyance Path 71

As illustrated in FIG. 2, the branched conveyance path 71 as one example of a second conveyance path extends under the straight portion 34 and over the supply roller 25. That is, the branched conveyance path 71 is provided on an opposite side of the pinch rollers 61 from the conveyor roller 60. The branched conveyance path 71 is branched off from the straight portion 34 at a first connecting position 101 located downstream of the output roller pair 44 in the conveying direction 15 and upstream of the reversible roller pair 45 in the conveying direction 15. The branched conveyance path 71 is merged with the curved portion 33 at a second connecting position 102 located upstream of the conveyor roller pair 59 in the conveying direction 15. That is, the branched conveyance path 71 is connected to the conveyance path 65 at the first connecting position 101 and the second connecting position 102.

The branched conveyance path 71 is defined by a third upper guide member 103 as one example of a first guide member and a second lower guide member 104 as one example of a second guide member which are opposed to each other at a predetermined distance. The third upper guide member 103 has an upper guide face defining a part of the branched conveyance path 71, in other words, the third upper guide member 103 has one of guide faces defining a part of the branched conveyance path 71, which one is nearer to the pinch rollers 61 than the other. The second lower guide member 104 has a lower guide face defining a part of the branched conveyance path 71, in other words, the second lower guide member 104 has the other guide face which is farther from the pinch rollers 61 than the one guide face. The third upper guide member 103 will be explained later in detail.

When the reversible roller 67 is rotated reversely, the reversible roller pair 45 conveys the recording sheet 12 through the branched conveyance path 71 in a conveying direction 106 (indicated by the dot-dot-dash arrow in FIG. 2) directed from the first connecting position 101 to the second connecting position 102.

As described above, the recording sheet 12 on which an image has been recorded on its front surface by the recording unit 24 is guided to the branched conveyance path 71 by the reversible roller 67 and the path switcher 41. After conveyed through the branched conveyance path 71 in the conveying direction 106, the recording sheet 12 passes through the second connecting position 102 and is conveyed through the curved portion 33 again in the conveying direction 15. The recording sheet 12 thereafter reaches to a position under the recording unit 24. In this state, a back surface of the recording sheet 12 faces the recording unit 24. The recording unit 24 records an image on the back surface of the recording sheet 12. Thereafter, the recording sheet 12 printed on both surfaces is conveyed by the output roller pair 44 and the reversible roller pair 45 in the conveying direction 15, then discharged to the recessed portion 80, and supported on the output tray 21.

Third Upper Guide Member 103

Figure 8:
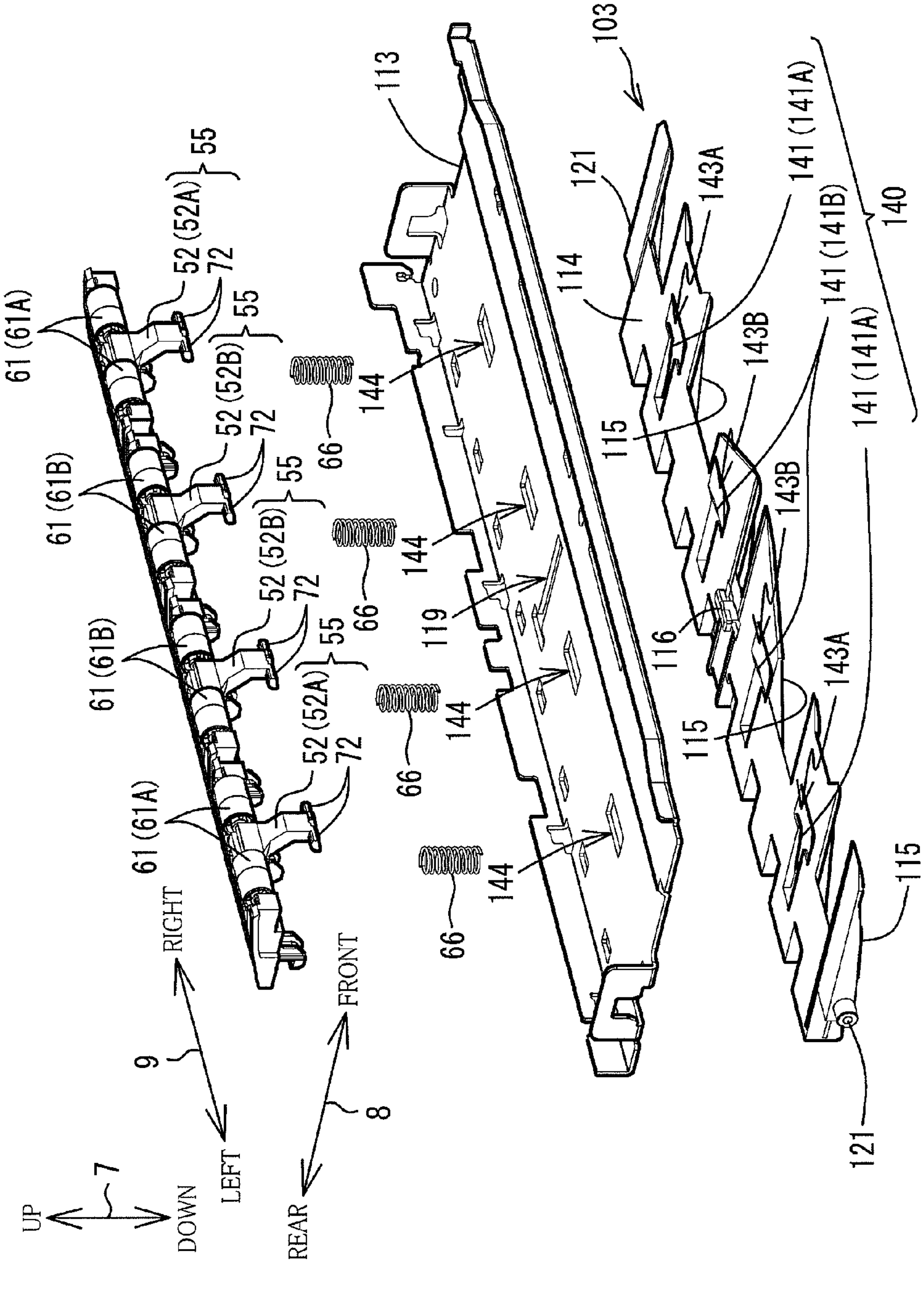
FIG. 8 is an exploded perspective view of FIG. 4A.
Figure 9:
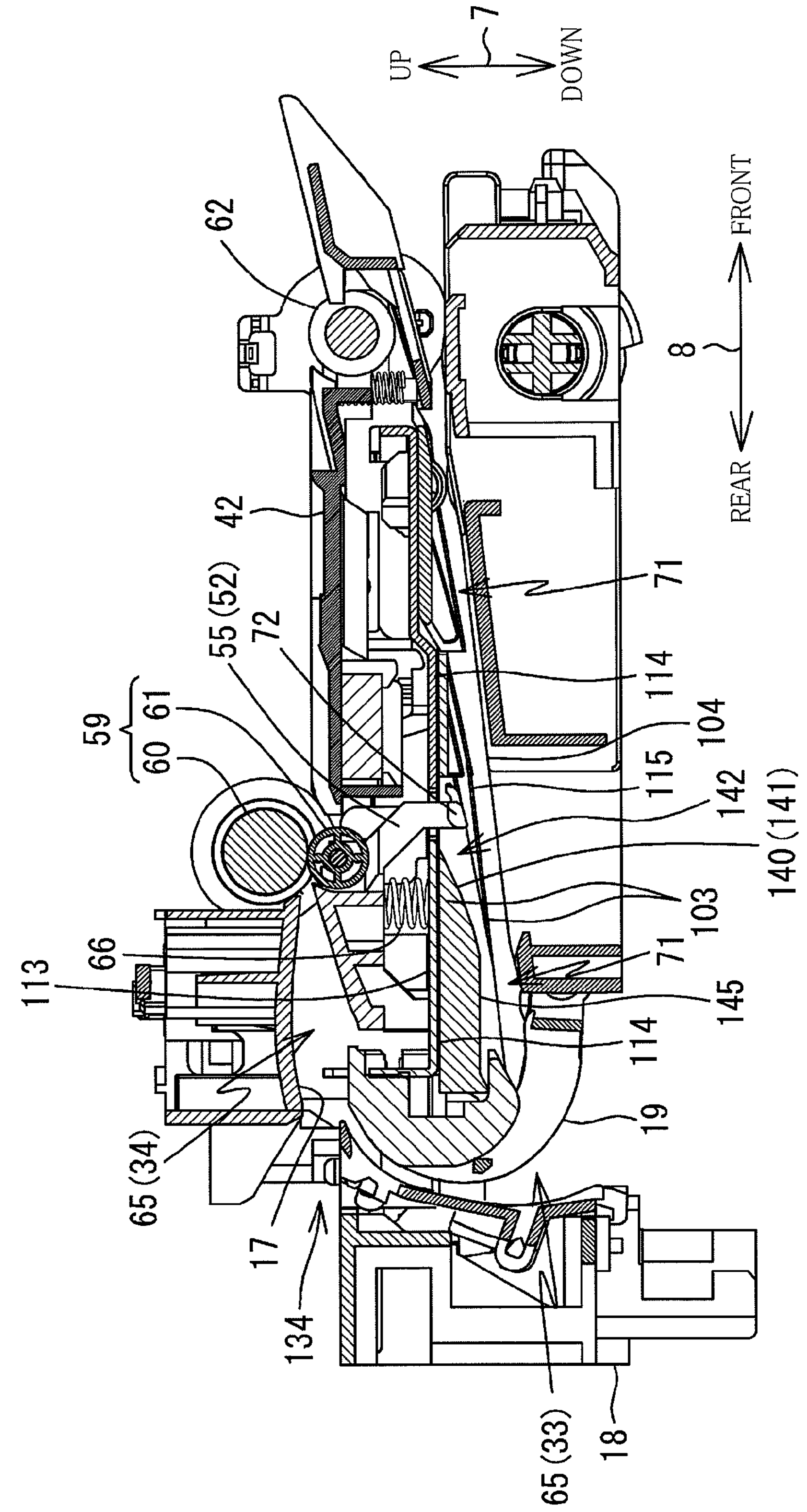
FIG. 9 is an elevational view in vertical cross section illustrating components around a conveyance path and a branched conveyance path of the printing section, with a third upper guide member located at a third position.

As illustrated in FIGS. 8 and 9, the third upper guide member 103 includes: an upper surface 114 extending in the front and rear direction 8 and the right and left direction 9; a lower surface 115 inclining such that a front portion thereof is located above a rear portion thereof; projections 121 projecting outward respectively from left and right ends of the third upper guide member 103; and a guide portion 140.

When the projections 121 are respectively inserted into holes 120 formed in a lever 90 (see FIGS. 3A and 3B) which will be described below, the third upper guide member 103 is coupled to and supported by the lever 90. Also, when an engaging portion 116 projecting from the upper surface 114 is inserted into an elongated hole 119 which is formed in the frame 113 so as to extend in the front and rear direction 8, the third upper guide member 103 is supported by the frame 113 so as to be movable in the front and rear direction 8 with respect to the frame 113. Also, the holes 120 of the lever 90 are formed, for example, at the same or higher position than the frame 113, whereby the upper surface 114 of the third upper guide member 103 is held in contact with a lower surface of the frame 113. It is noted that the third upper guide member 103 may be held in contact with the lower surface of the frame 113 by being urged by springs or other similar components.

In view of the above, the third upper guide member 103 is moved together with the lever 90 moved in the front and rear direction 8, so that the third upper guide member 103 is moved in the front and rear direction 8 as one example of an intersecting direction in a state in which the third upper guide member 103 is held in contact with the frame 113. It is noted that the direction of the movement of the third upper guide member 103 i.e., the front and rear direction 8 intersects a direction of movement of the supporters 55, i.e., the up and down direction 7, which will be described below.

Figure 10:
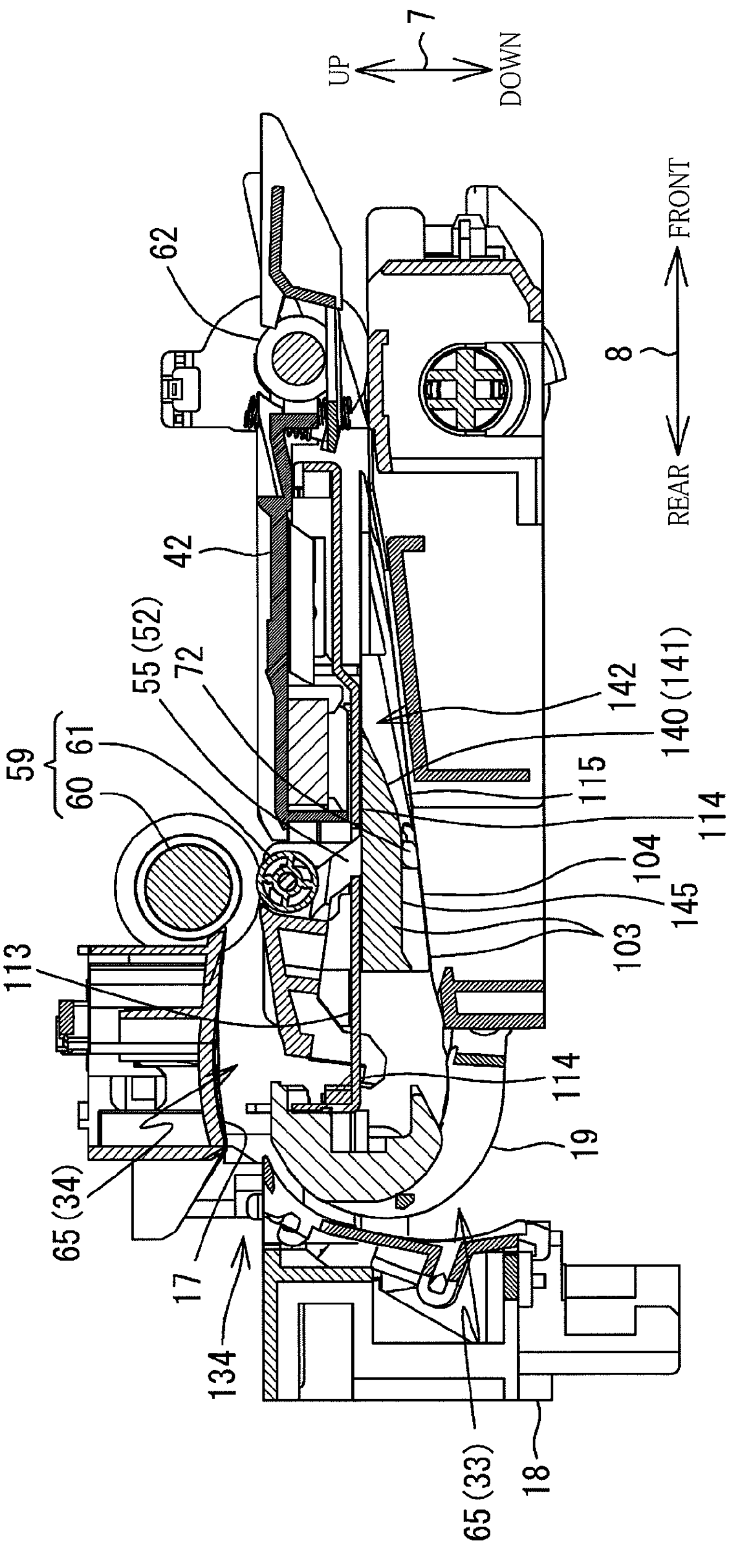
FIG. 10 is an elevational view in vertical cross section illustrating the components around the conveyance path and the branched conveyance path of the printing section, with the third upper guide member located at a fourth position.

The third upper guide member 103 is movable between a third position illustrated in FIG. 9 and a fourth position illustrated in FIG. 10. Here, as illustrated in FIG. 9, when the third upper guide member 103 is located at the third position, a predetermined space is formed between the third upper guide member 103 and the second lower guide member 104. This predetermined space has a distance appropriate for conveying the recording sheet 12 and serves as the branched conveyance path 71. When the predetermined space is formed, the lower surface 115 serves as an upper guide face for the branched conveyance path 71.

The fourth position is located in front of the third position. As illustrated in FIG. 10, when the third upper guide member 103 is located at the fourth position, the third upper guide member 103 is held in contact with the second lower guide member 104. That is, the third upper guide member 103 is moved between the third position at which the third upper guide member 103 is spaced apart from the second lower guide member 104 at a distance illustrated in FIG. 9 and the fourth position at which the distance between the third upper guide member 103 and the second lower guide member 104 is less than the distance illustrated in FIG. 9. It is noted that when the third upper guide member 103 is located at the fourth position, the third upper guide member 103 may not contact the second lower guide member 104 as long as the distance between the second lower guide member 104 and the third upper guide member 103 located at the fourth position is shorter than the distance between the second lower guide member 104 and the third upper guide member 103 located at the third position.

As illustrated in FIG. 9, the guide portion 140 includes four inclined faces 141 (each as one example of an inclined portion) provided in a space 142 formed between the upper surface 114 and the lower surface 115. The third upper guide member 103 has a member forming the upper surface 114, and each of the inclined faces 141 forms a portion of an opposite surface of the member from the upper surface 114. Each inclined face 141 inclines with respect to the front and rear direction 8 such that a front portion thereof is located above a rear portion thereof. That is, the inclined faces 141 of the upper guide member 103 at the third position extend toward the fourth position, i.e., in the front direction while inclining toward the pinch rollers 61 with respect to the front and rear direction 8. In other words, each inclined face 141 inclines with respect to the front and rear direction so as to be nearer to the pinch rollers 61 in the up and down direction 7 at its portion near the fourth position (i.e., a front portion of the inclined face 141) than its portion near the third position (i.e., a rear portion of the inclined face 141). More specifically, each inclined face 141 inclines with respect to the front and rear direction such that the distance between the inclined face 141 and the pinch rollers 61 in the up and down direction 7 decreases from the portion near the fourth position to the portion near the third position.

As illustrated in FIG. 8, the four inclined faces 141 are provided so as to be spaced apart from each other in the right and left direction 9. It is noted that the number of the inclined faces 141 is not limited to four. The inclined faces 141 are provided under the respective supporters 55. The four inclined faces 141 include two inclined faces 141A (each as one example of a first inclined portion) respectively located on opposite end portions of the third upper guide member 103 in the right and left direction 9; and two inclined faces 141B (each as one example of a second inclined portion) located on a central portion of the third upper guide member 103 in the right and left direction 9. The angle of inclination of each inclined face 141A with respect to the front and rear direction 8 is smaller than that of each inclined face 141B. Specifically, a front end of each inclined face 141A and a front end of each inclined face 141B are located at the same position in the front and rear direction 8 and in the up and down direction 7. However, a rear end of the inclined face 141A and a rear end of the inclined face 141B are located at the same position in the front and rear direction 8 but different in the up and down direction 7, specifically, the rear end of the inclined face 141A is located higher than the rear end of the inclined face 141B.

As illustrated in FIG. 8, the upper surface 114 has openings 143A, 143B. The openings 143A are formed on an upper side of the respective inclined faces 141A. The openings 143B are formed on an upper side of the respective inclined faces 141B.

Protrusions 52 of the moving mechanism 50 which will be described below are to be inserted into the respective openings 143A, 143B.

Each of the openings 143A, 143B extends in the front and rear direction 8. Thus, the protrusions 52 inserted in the respective openings 143A, 143B are movable in the front and rear direction 8. A front end portion of each of the openings 143A, 143B has a larger width in the right and left direction 9 than that of the other portion of each of the openings 143A, 143B. Thus, contact portions 72 (which will be described below) provided on distal end portions of the respective protrusions 52 are insertable into the openings 143A, 143B via the front end portions thereof, respectively.

The inclined faces 141 and the contact portions 72 are provided at the same position in the right and left direction 9. Thus, in the state in which the protrusions 52 are inserted in the respective openings 143A, 143B, the contact portions 72 are contactable with the respective inclined faces 141 from a lower side of the inclined faces 141. In other words, the inclined faces 141 are contactable with the contact portions 72 from a side of the contact portions 72 nearer to the pinch rollers 61 (i.e., from an upper side of the contact portions 72).

Moving Mechanism 50

As illustrated in FIGS. 4A, 4B, 5A, 5B, and 8, the printing section 11 includes the moving mechanism 50. The moving mechanism 50 includes: the supporters 55; the elastic members 66; and the lever 90 (see FIGS. 6 and 7) which will be described below. Each of the supporters 55 includes a corresponding one of the protrusions 52 (each as one example of a projection) which projects from the supporter 55 in the down direction, i.e., toward the third upper guide member 103.

Here, the pinch rollers 61 include pinch rollers 61A and pinch rollers 61B. The pinch rollers 61A are respectively arranged on right and left sides, i.e., outer sides of the support region 112 (see FIG. 11) in the right and left direction 9 in a state in which the media tray 110 having the support region 112 at its central portion is inserted in the MFP 10. The pinch rollers 61B are respectively arranged at positions corresponding to the support region 112 in the right and left direction 9.

The distal end portion of each protrusion 52 is provided with a corresponding one of the contact portions 72 which projects in the right and left direction 9 intersecting the down direction as the direction in which the protrusion 52 projects. The projections 52 include protrusions 52A each projecting from the corresponding supporter 55 for supporting a corresponding pair of pinch rollers 61A. Each of the protrusions 52A is inserted into the space 142 (see FIG. 9) through a corresponding one of openings 144 formed in the frame 113 and a distal end portion of a corresponding one of the openings 143A formed in the third upper guide member 103. The contact portion 72 provided on each protrusion 52A inserted into the space 142 is contactable with a corresponding one of the inclined faces 141A.

The projections 52 include protrusions 52B each projecting from the corresponding supporter 55 for supporting a corresponding pair of pinch rollers 61B. Each of the protrusions 52B is inserted into the space 142 through a corresponding one of the openings 144 and a distal end portion of a corresponding one of the openings 143B. The contact portion 72 provided on each protrusion 52B inserted into the space 142 is contactable with a corresponding one of the inclined faces 141B.

As will be described below, movement of the supporters 55 in the up and down direction 7 that is a direction of movement of the pinch rollers 61 toward and away from the conveyor roller 60 switches the state of the conveyor roller pair 59 selectively to one of (i) a first state (illustrated in FIG. 5A and indicated by the solid lines in FIG. 2) in which the conveyor roller 60 is held in contact with the pinch rollers 61, and the conveyor roller pair 9 can nip the recording sheet 12 and (ii) the second state (illustrated in FIG. 5B and indicated by the broken line in FIG. 2) in which the pinch rollers 61 are spaced apart from the conveyor roller 60, and the conveyor roller pair 9 can nip the media tray 110.

The state of the output roller pair 44 is switched, by movement of the shaft 64 of the output roller 62 in the up and down direction 7, selectively to one of (i) a first state (indicated by the solid lines in FIG. 2) in which the output roller 62 is held in contact with the spurs 63, and the output roller pair 44 can nip the recording sheet 12 and (ii) the second state (indicated by the broken line in FIG. 2) in which the output roller 62 is spaced apart from the spurs 63, and the output roller pair 44 can nip the media tray 110.

The state of the reversible roller pair 45 is switched, by movement of the shaft 69 of the reversible roller 67 in the up and down direction 7, selectively to one of (i) a first state (indicated by the solid lines in FIG. 2) in which the reversible roller 67 is held in contact with the spurs 68, and the reversible roller pair 45 can nip the recording sheet 12 and (ii) a second state (indicated by the broken line in FIG. 2) in which the reversible roller 67 is spaced apart from the spurs 68 and located below a lower surface of the media tray 110.

As will be described below, the shaft 64 and the shaft 69 are moved upward and downward by movement of the lever 90 in the front and rear direction 8. Also, the supporters 55 are moved upward and downward by movement of the third upper guide member 103 in the front and rear direction 8 together with the lever 90.

Figure 3A:
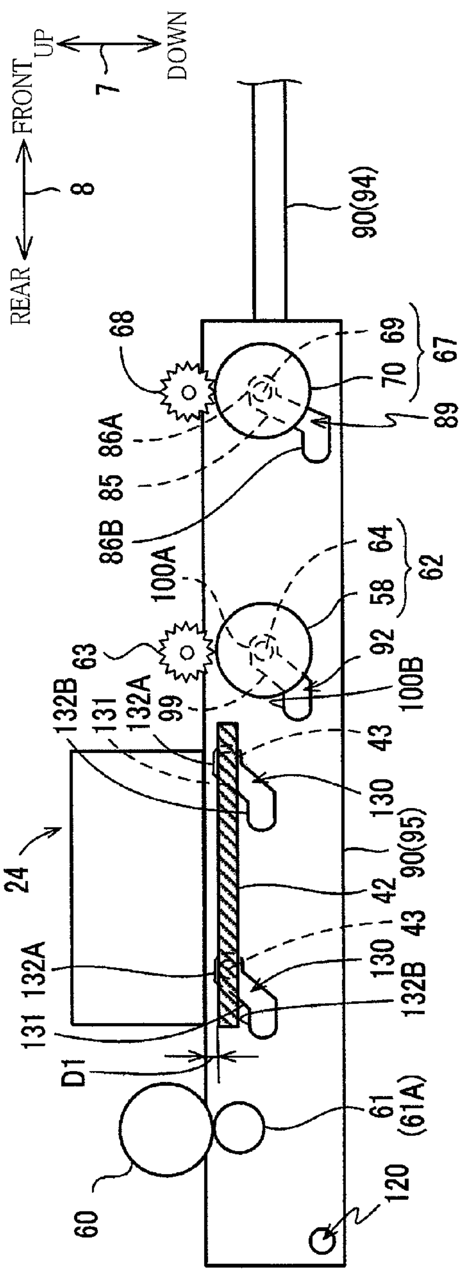
Figure 3B:
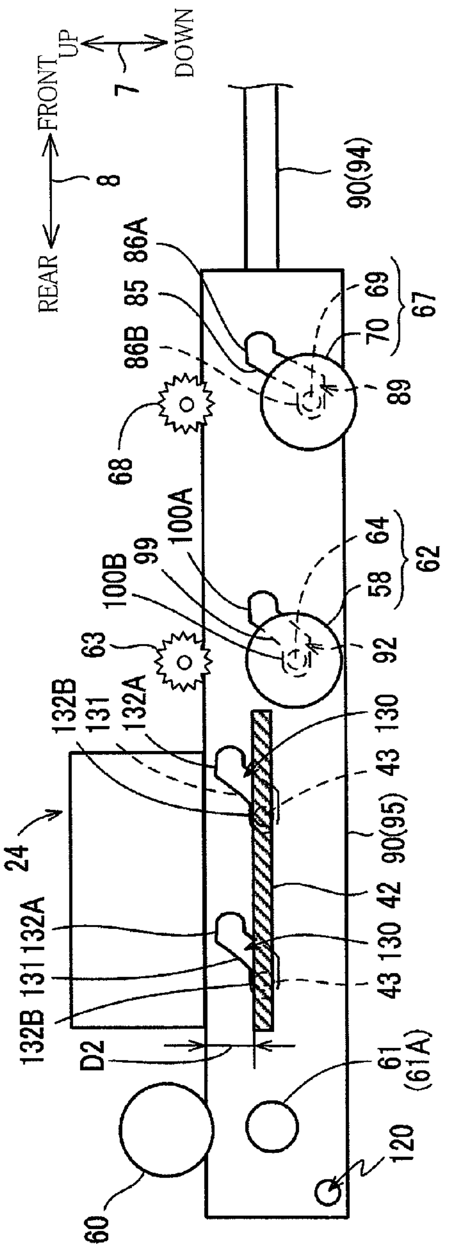

As illustrated in FIGS. 3A and 3B, projections 43 projecting outward are respectively provided on right and left faces of the platen 42. The projections 43 are respectively fitted in openings 130 formed in the lever 90. As will be described below, the state of the platen 42 is switched, by upward and downward movement of the projections 43, selectively to one of (i) a first state (see FIG. 3A) in which the platen 42 is spaced apart from the recording unit 24 at a distance D1 and (ii) a second state (see FIG. 3B) in which the platen 42 is spaced apart from the recording unit 24 at a distance D2 which is greater than the distance D1.

When the recording sheet 12 is conveyed through the straight portion 34, the platen 42 is in the first state to support the recording sheet 12. When the media tray 110 is conveyed through the straight portion 34, on the other hand, the platen 42 is in the second state, that is, the platen 42 is located below the media tray 110 to be conveyed. This construction avoids a contact of the media tray 110 with the platen 42.

In view of the above, each of the conveyor roller pair 59, the output roller pair 44, the reversible roller pair 45, and the platen 42 is in the first state when image recording is performed on the recording sheet 12, and is in the second state when image recording is performed on the storage medium supported on the media tray 110. A user can switch the state of each component between the first state and the second state by moving the lever 90 which will be described below.

Lever 90

The printing section 11 is equipped with the lever 90 illustrated in FIGS. 3A and 3B which is provided movably in the front and rear direction 8. The lever 90 is movable between a fifth position illustrated in FIG. 3A and a sixth position illustrated in FIG. 3B which is in front of the fifth position.

Figure 6:
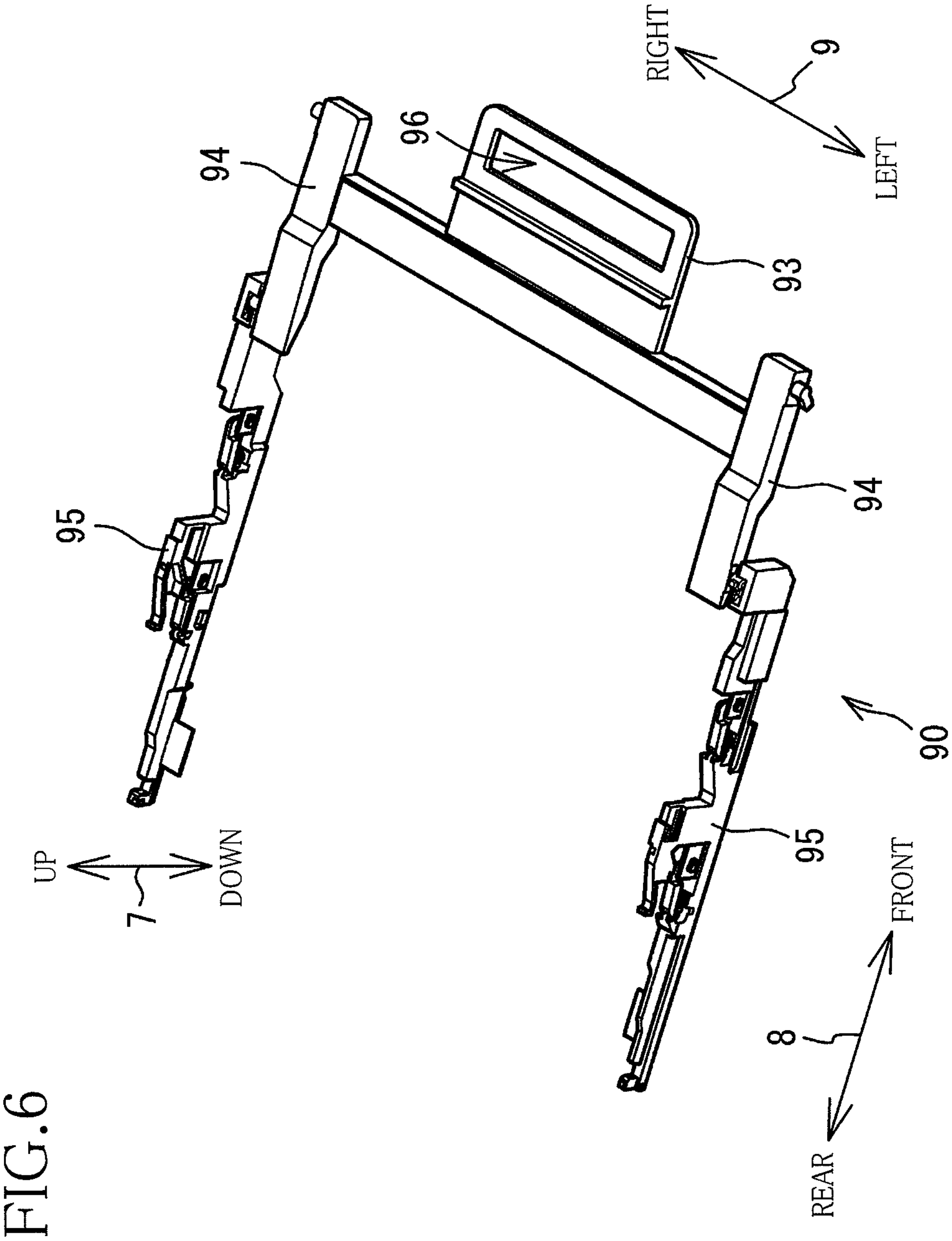
FIG. 6 is a perspective view of the lever.
Figure 7:
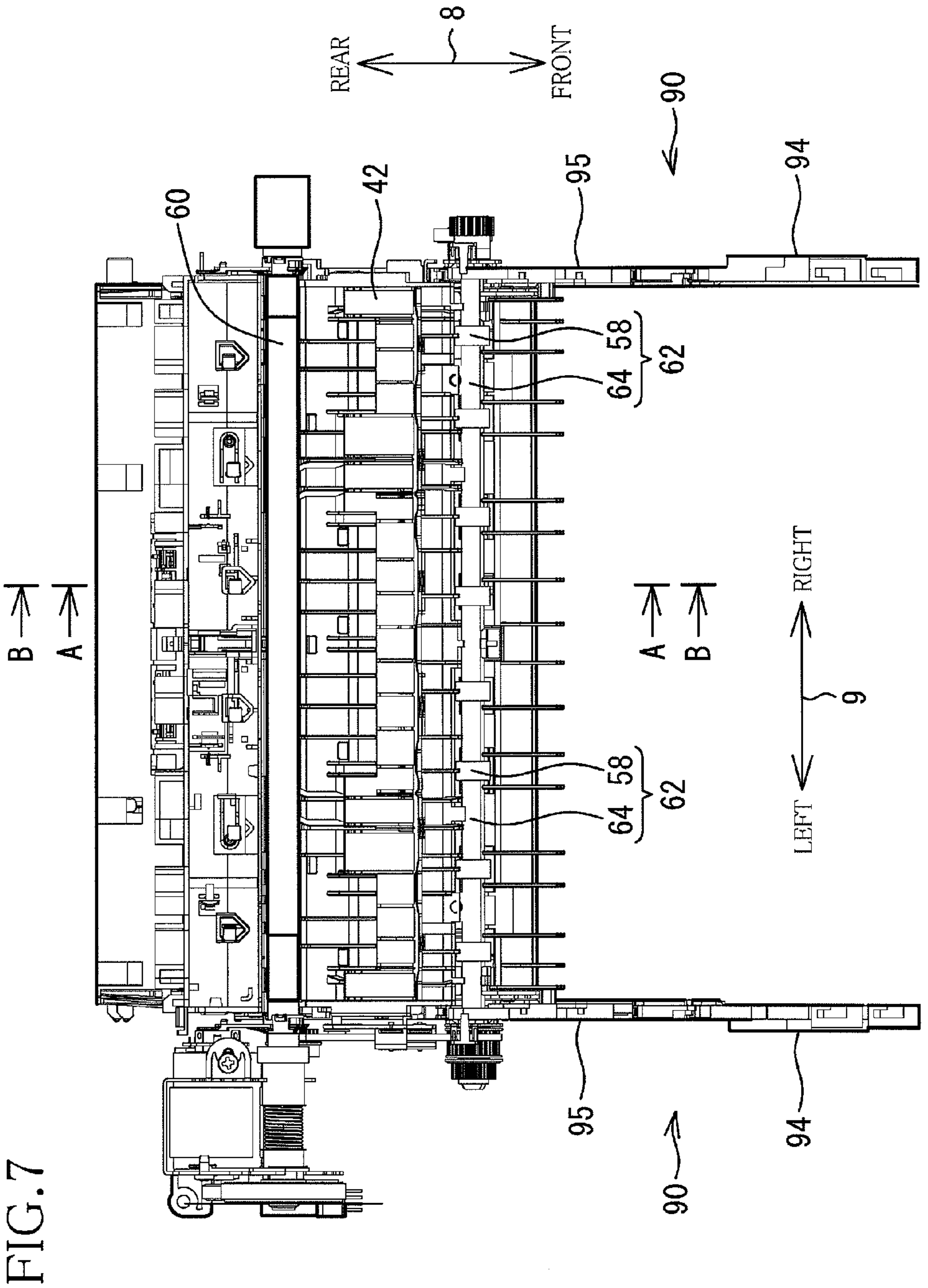
FIG. 7 is a plan view illustrating components around the lever and the platen.

As illustrated in FIGS. 6 and 7, the lever 90 includes: a handle 93 to be held by the user; a pair of guide portions 95 extending in the front and rear direction 8; and a pair of connecting portions 94 for connecting the handle 93 and the guide portions 95. The connecting portions 94 extend rearward respectively from right and left end portions of the handle 93 such that rear end portions of the connecting portions 94 are connected to front end portions of the respective guide portions 95.

As illustrated in FIG. 1A, the handle 93 is disposed near the opening 13 in the recessed portion 80 and near an upper end of the opening 13. The handle 93 is exposed to the outside of the MFP 10 through the opening 13. It is noted that a portion of the lever 90 other than the handle 93 may also be exposed to the outside of the MFP 10. That is, at least a portion of the lever 90 is exposed to the outside of the MFP 10. As illustrated in FIG. 6, the handle 93 extends in the right and left direction 9 and has an opening 96 at its central portion in the right and left direction 9. The user can insert his or her fingers into the opening 96 to hold the handle 93.

As illustrated in FIGS. 6 and 7, each of the connecting portions 94 is shaped like a planar plate elongated in the front and rear direction 8. One of the pair of connecting portions 94 extends in the front and rear direction 8 near a right edge and an upper edge of the recessed portion 80. The other of the pair of connecting portions 94 extends in the front and rear direction 8 near a left edge and the upper edge of the recessed portion 80. The connecting portions 94 are supported by inner walls 81 of the housing 14 of the printing section 11 (see FIG. 1) so as to be movable in the front and rear direction 8.

As illustrated in FIGS. 3A, 3B, 6, and 7, the guide portions 95 extend from a front side of the reversible roller pair 45 to a rear side of the conveyor roller pair 59 in the front and rear direction 8. The guide portions 95 are arranged respectively on a right side of a right edge of the straight portion 34 and on a left side of a left edge of the straight portion 34. The guide portions 95 are supported by frames, not shown, of the printing section 11.

As illustrated in FIGS. 3A and 3B, each of the guide portions 95 has openings 92, 89, the two openings 130, and the hole 120. The opening 92 is defined by an inclined face 99 whose front portion is located above its rear portion, a horizontal face 100A connected to a front end of the inclined face 99 and extending in the front and rear direction 8, and a horizontal face 100B connected to a rear end of the inclined face 99 and extending in the front and rear direction 8.

The opening 89 is defined by an inclined face 85 whose front portion is located above its rear portion, a horizontal face 86A connected to a front end of the inclined face 85 and extending in the front and rear direction 8, and a horizontal face 86B connected to a rear end of the inclined face 85 and extending in the front and rear direction 8. Here, the horizontal face 86B is located below the horizontal face 100B.

Each of the openings 130 is defined by an inclined face 131 whose front portion is located above its rear portion, a horizontal face 132A connected to a front end of the inclined face 131 and extending in the front and rear direction 8, and a horizontal face 132B connected to a rear end of the inclined face 131 and extending in the front and rear direction 8.

Each hole 120 is generally similar in shape and size to the corresponding projection 121 provided on the third upper guide member 103 (see FIGS. 4A, 4B, and 8).

Movement of Lever 90

There will be next explained the switch of the state of the conveyor roller pair 59 with the movement of the lever 90. As illustrated in FIGS. 3A and 5A, when the lever 90 is located at the fifth position, the contact portions 72 as illustrated in FIG. 9 are located in front of the inclined faces 141. In this state, the pinch rollers 61 are held in contact with the conveyor roller 60 by urging forces of the elastic members 66 (see FIGS. 4A and 4B). That is, the conveyor roller pair 59 is in the first state. In this state, each of the supporters 55 is located at the first position, and the third upper guide member 103 is located at the third position.

When the user holds the handle 93 and pulls the lever 90 in the front direction, the lever 90 is moved from the fifth position in the front direction. In this movement, the third upper guide member 103 is moved in the front direction together with the lever 90. That is, the third upper guide member 103 is moved in the front direction from the third position. As a result, the inclined faces 141 are brought into contact with the respective contact portions 72 from a side of the contact portions 72 which is nearer to the pinch rollers 61, i.e., from an upper side of the contact portions 72. When the lever 90 and the third upper guide member 103 are moved further in the front direction, the contact portions 72 are slid on the respective inclined faces 141 so as to be moved relative to the respective inclined faces 141. As a result, the contact portions 72 are respectively moved downward against the urging forces of the elastic members 66 while guided by the inclined faces 141.

With this movement of the contact portions 72, the supporters 55 including the respective contact portions 72, and the pinch rollers 61 supported by the respective supporters 55 are also moved downward. That is, each of the supporters 55 is moved from the first position to the second position. As a result, the pinch rollers 61 are spaced apart from the conveyor roller 60. When the lever 90 is thereafter moved further in the front direction, the contact portions 72 as illustrated in FIG. 10 are held in contact with horizontal faces 145 extending continuously from rear edges of the respective inclined faces 141. In this state, the lever 90 is located at the sixth position, and the third upper guide member 103 is located at the fourth position. That is, when the lever 90 is located at the sixth position, and the third upper guide member 103 is located at the fourth position, the conveyor roller pair 59 is in the second state illustrated in FIG. 5B.

Here, the inclination angle of each inclined face 141A is smaller than that of each inclined face 141B as described above. Thus, an amount of upward/downward movement of the protrusions 52A including the contact portions 72 slid on the respective inclined faces 141A is smaller than an amount of upward/downward movement of the protrusions 52B including the contact portions 72 slid on the respective inclined faces 141B. That is, an amount of upward/downward movement of the pinch rollers 61A supported by the supporters 55 including the respective protrusions 52A is smaller than an amount of upward/downward movement of the pinch rollers 61B supported by the supporters 55 including the respective protrusions 52B.

Figure 5B:
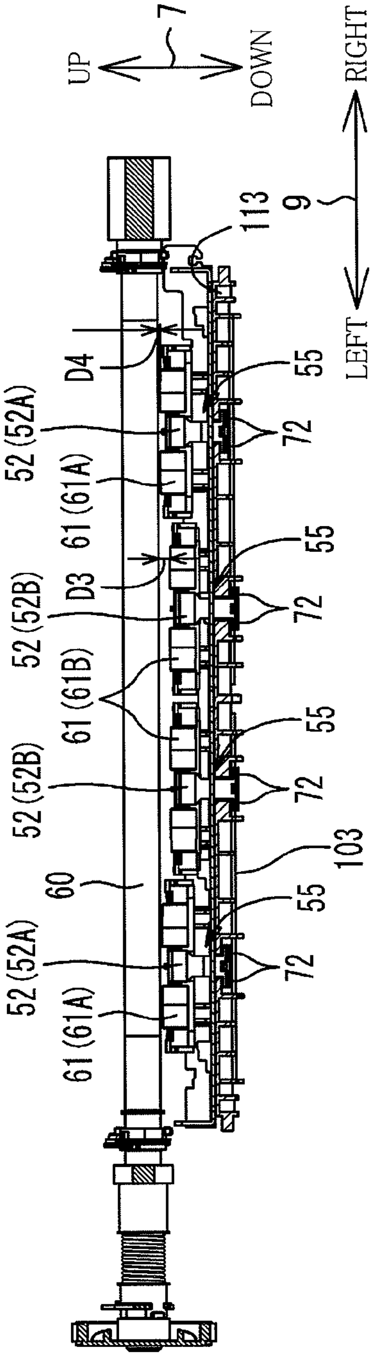

That is, in the second state, as illustrated in FIG. 5B, a distance D3 (as one example of a second distance) between the pinch rollers 61B and the conveyor roller 60 is greater than a distance D4 (as one example of a first distance) between the pinch rollers 61A and the conveyor roller 60.

In view of the above, the inclined faces 141 provided on the guide portion 140 of the third upper guide member 103 respectively contact the supporters 55 and move the supporters 55 from the first position to the second position in response to the movement of the third upper guide member 103 from the third position to the fourth position.

In this movement, the inclined faces 141A are held in contact with ones of the contact portions 72 (i.e., the contact portions 72 provided on the respective protrusions 52A) to move the respective supporters 55 supporting the pinch rollers 61A, by the distance D4. Also, the inclined faces 141B are held in contact with the others of the contact portions 72 (i.e., the contact portions 72 provided on the respective protrusions 52B) to move the respective supporters 55 supporting the pinch rollers 61B, by the distance D3 that is greater than the distance D4.

Here, the distance D3 is greater than the thickness of the media tray 110 which is the length of the media tray 110 in the up and down direction 7 in the state in which the media tray 100 is inserted in the MFP 10. The distance D4 is less than the thickness of the media tray 110. Accordingly, the media tray 110 inserted in the MFP 10 is nipped between the conveyor roller 60 and the pinch rollers 61A but not nipped between the conveyor roller 60 and the pinch rollers 61B. That is, the conveyor roller 60 and the pinch rollers 61 nip and convey the media tray 110 in the state in which the third upper guide member 103 is located at the fourth position.

There will be next explained the switch of the state of the output roller pair 44 with the movement of the lever 90. As illustrated in FIG. 3A, when the lever 90 is located at the fifth position, the shaft 64 of the output roller 62 is located under the horizontal face 100A in the opening 92. In this state, the output roller 62 is held in contact with the spurs 63 by urging forces of elastic members, not shown. That is, the output roller pair 44 is in the first state.

When the user holds the handle 93 and pulls the lever 90 in the front direction, the lever 90 is moved from the fifth position in the front direction, so that the shaft 64 is brought into contact with the inclined face 99. When the lever 90 is moved further in the front direction, the shaft 64 is slid on the inclined face 99 so as to be moved relative to the inclined face 99. As a result, the shaft 64 is moved downward. That is, the output roller 62 is moved downward while guided by the inclined face 99 and spaced apart from the spurs 63. That is, the second state of the output roller pair 44 is established.

When the lever 90 is thereafter moved further in the front direction, as illustrated in FIG. 3B, the shaft 64 is held in contact with the horizontal face 100B by the urging forces of the elastic members. In this state, the lever 90 is located at the sixth position. That is, when the lever 90 is located at the sixth position, the output roller pair 44 is in the second state.

There will be next explained the switch of the state of the reversible roller pair 45 with the movement of the lever 90. As illustrated in FIG. 3A, when the lever 90 is located at the fifth position, the shaft 69 of the reversible roller 67 is located under the horizontal face 86A in the opening 89. In this state, the reversible roller 67 is held in contact with the spurs 68 by urging forces of elastic members, not shown. That is, the reversible roller pair 45 is in the first state.

When the user holds the handle 93 and pulls the lever 90 in the front direction, the lever 90 is moved from the fifth position in the front direction, so that the shaft 69 is brought into contact with the inclined face 85. When the lever 90 is moved further in the front direction, the shaft 69 is slid on the inclined face 85 so as to be moved relative to the inclined face 85. As a result, the shaft 69 is moved downward. That is, the reversible roller 67 is moved downward while guided by the inclined face 85 and spaced apart from the spurs 68. That is, the second state of the reversible roller pair 45 is established.

When the lever 90 is thereafter moved further in the front direction, as illustrated in FIG. 3B, the shaft 69 is held in contact with the horizontal face 86B by the urging forces of the elastic members. In this state, the lever 90 is located at the sixth position. That is, when the lever 90 is located at the sixth position, the reversible roller pair 45 is in the second state. It is noted that the horizontal face 86B is located below the horizontal face 100B as described above, and accordingly when the reversible roller pair 45 is in the second state, the reversible roller 67 is located below the output roller 62.

There will be next explained the switch of the state of the platen 42 with the movement of the lever 90. As illustrated in FIG. 3A, when the lever 90 is located at the fifth position, each of the projections 43 provided on the platen 42 is located under the horizontal face 132A defining a corresponding one of the openings 130. In this state, the platen 42 is in the first state.

When the user holds the handle 93 and pulls the lever 90 in the front direction, the lever 90 is moved from the fifth position in the front direction, so that each of the projections 43 is brought into contact with a corresponding one of the inclined faces 131. When the lever 90 is moved further in the front direction, the projection 43 is slid on the inclined face 131 so as to be moved relative to the inclined face 131. As a result, the projection 43 is moved downward. That is, the platen 42 is moved downward, and the second state thereof is established.

When the lever 90 is thereafter moved further in the front direction, as illustrated in FIG. 3B, the projections 43 are held in contact with the respective horizontal faces 132B by urging forces of elastic members, not shown. In this state, the lever 90 is located at the sixth position. That is, when the lever 90 is located at the sixth position, the platen 42 is in the second state.

When the lever 90 is moved from the sixth position to the fifth position, the above-described operations are performed in reverse. That is, the third upper guide member 103 is moved from the fourth position to the third position, and the contact portions 72 are slid on the respective inclined faces 141, so that the pinch rollers 61 are moved upward and brought into contact with the conveyor roller 60. Also, the shaft 64 is moved off the horizontal face 100B and slid on the inclined face 99, so that the output roller 62 is moved upward and brought into contact with the spurs 63. Also, the shaft 69 is moved off the horizontal face 86B and slid on the inclined face 85, so that the reversible roller 67 is moved upward and brought into contact with the spurs 68. Also, each projection 43 is moved off the corresponding horizontal face 132B and slid on the inclined face 131, so that the platen 42 is moved upward.

In view of the above, the lever 90 is movable between (i) the fifth position at which the third upper guide member 103 is located at the third position, and each of the output roller pair 44, the reversible roller pair 45, and the platen 42 is in the first state and (ii) the sixth position at which the third upper guide member 103 is located at the fourth position, and each of the output roller pair 44, the reversible roller pair 45, and the platen 42 is in the second state. The third upper guide member 103 is movable between the third position at which the conveyor roller pair 59 is in the first state and the fourth position at which the conveyor roller pair 59 is in the second state.

It is noted that the above-described construction of the lever 90 is one example. That is, the construction of the lever 90 is not limited to the above-described one as long as the movement of the lever 90 can change the position of the third upper guide member 103 and the states of the roller pairs 44, 45 and the platen 42. For example, the openings 89, 92, 130 formed in the lever 90 may be replaced with ribs projecting from the guide portions 95 in the right and left direction 9 and extending in the same direction as the openings 89, 92, 130 so as to support the shafts 64, 69 and the projections 43.

Operations of Media Tray 110

There will be next explained a procedure in which the media tray 110 is inserted into the MFP 10, and an image is recorded on the storage medium placed on the media tray 110.

The lever 90 is normally located at the fifth position to maintain a state in which the MFP 10 can record an image on the recording sheet 12. When the lever 90 is located at the fifth position, each of the output roller pair 44, the reversible roller pair 45, and the platen 42 is in the first state. Thus, the output roller pair 44 and the reversible roller pair 45 can convey the recording sheet 12, and the platen 42 is kept spaced apart from the recording unit 24 at the distance allowing the recording unit 24 to record an image appropriately on the recording sheet 12 supported on the platen 42.

Also, when the lever 90 is located at the fifth position, the third upper guide member 103 is located at the third position, and the conveyor roller pair 59 is in the first state, so that the conveyor roller pair 59 can convey the recording sheet 12. In addition, a predetermined space appropriate for conveyance of the recording sheet 12 is formed between the third upper guide member 103 and the second lower guide member 104 respectively serving as the guide faces for defining the branched conveyance path 71.

When the lever 90 is moved from the fifth position to the sixth position by an operation of the user, each of the output roller pair 44, the reversible roller pair 45, and the platen 42 is switched from the first state to the second state. Also, when the lever 90 is moved from the fifth position to the sixth position, the third upper guide member 103 is moved from the third position to the fourth position. In this movement, each of the supporters 55 is moved from the first position to the second position, and the conveyor roller pair 59 is switched from the first state to the second state. As a result, each of the roller pairs 59, 44, 45 and the platen 42 is moved from the position indicated by the solid lines in FIG. 2 to the position indicated by the broken lines in FIG. 2.

These movements allow the conveyor roller pair 59 and the output roller pair 44 to nip and convey the media tray 110 along the straight portion 34. Also, each of the platen 42 and the reversible roller 67 is moved downward to a position at which each of the platen 42 and the reversible roller 67 does not contact the media tray 110 conveyed through the straight portion 34. Also, the third upper guide member 103 is moved to the fourth position at which the third upper guide member 103 is held in contact with the second lower guide member 104. This contact inhibits the recording sheet 12 from being conveyed through the branched conveyance path 71.

In a state in which the media tray 110 supporting the storage medium thereon is supported on a tray guide 111, the user then inserts the media tray 110 into the straight portion 34 in the rear direction, with an edge portion 118 (see FIG. 11) of the media tray 100 as a leading edge. The media tray 110 is inserted to a position at which at least the edge portion 118 is nipped by the output roller pair 44. It is noted that the media tray 110 may be inserted to a position located at a rear of this position, for example, the media tray 110 may be inserted to a position at which the leading edge portion is nipped by the conveyor roller pair 59.

The user then selects an image recording function by operating an operation panel 133 (see FIG. 1) provided on an upper portion of a front face of the MFP 10. In response, the conveyor motor transmits reverse-rotation driving power to the conveyor roller 60 and the output roller 62, so that the media tray 110 is conveyed by the output roller pair 44 in the rear direction through the straight portion 34.

The media tray 110 is conveyed to a position at which the storage medium supported on the media tray 100 is located at a rear of the recording unit 24. In this position, the leading edge portion of the media tray 110 projects from the opening 134 formed in a rear face of the printing section 11. It is noted that the media tray 110 may not project from the rear face of the printing section 11. This configuration can be achieved by a construction in which a portion of the printing section 11 at a rear of the recording unit 24 has a length longer than that in the present embodiment in the front and rear direction 8.

In this state, driving power to be transmitted from the conveyor motor to the conveyor roller 60 and the output roller 62 is switched from reverse-rotation driving power to forward-rotation driving power. This forward-rotation driving power causes the media tray 110 to be conveyed in the front direction, so that the storage medium placed on the media tray 110 passes through a position under the recording unit 24. The recording head 38 ejects ink droplets onto the storage medium conveyed under the recording unit 24 to record an image on the face of the storage medium. The media tray 110 is then discharged to the outside of the MFP 10 from the opening 13.

It is noted that the recording unit 24 records an image on the storage medium during the conveyance of the media tray 100 in the front direction in the present embodiment but may record an image on the storage medium during conveyance of the media tray 100 in the rear direction.

Effects

In the present embodiment, when the third upper guide member 103 is located at the third position, the conveyor roller 60 and the pinch rollers 61 are held in contact with each other. In this state, the third upper guide member 103 and the second lower guide member 104 are spaced apart from each other at the predetermined distance. When the third upper guide member 103 is moved from the third position to the fourth position, the supporters 55 are brought into contact with the guide portion 140 of the third upper guide member 103 and guided by the guide portion 140. As a result, the pinch rollers 61 are moved off the conveyor roller 60. Also, when the third upper guide member 103 is located at the fourth position, the third upper guide member 103 is nearer to the second lower guide member 104 than at the third position, and the above-described predetermined distance is smaller. That is, the same space can be used for both of a space in which the third upper guide member 103 at the fourth position is located and a space constituting the branched conveyance path 71.

The sliding movement of the supporters 55 on the guide portion 140 is utilized to achieve the share of the space, eliminating the need of a complex mechanism using a motor and other components. Also, the third upper guide member 103 acts on the pinch rollers 61 by the contact with the supporters 55 and is not formed integrally with the pinch rollers 61. Thus, a space for arrangement of other components can be easily formed between the third upper guide member 103 and the pinch rollers 61 by reduction in the area of the contact between the third upper guide member 103 and the supporters 55, for example. The above-described constructions allow conveyance of not only the recording sheet 12 but also rigid storage media and can reduce increase in size of the MFP 10.

In the present embodiment, the third upper guide member 103 is moved while keeping its contact with the metal frame 113, whereby the third upper guide member 103 can be moved with higher accuracy. Accordingly, the supporters 55 held in contact with the third upper guide member 103 and the pinch rollers 61 supported by the supporters 55 can be moved with higher accuracy.

In the present embodiment, the guide portion 140 includes the inclined faces 141, enabling easy construction of the guide portion 140. Also, a mechanism for moving the supporters 55 by means of the guide portion 140 can be easily provided with a simple construction.

In the present embodiment, the inclined faces 141 include the inclined faces 141A and the inclined faces 141B, making it possible to move the pinch rollers 61 and the supporters 55 by different amounts.

In the present embodiment, when the third upper guide member 103 is located at the fourth position, the media tray 110 can be nipped by the conveyor roller 60 and the pinch rollers 61 only at the area outside the support region 112 in the right and left direction 9. This construction prevents an occurrence of a situation in which a portion of a lower face of the media tray 110 which corresponds to the support region 112 is pressed by the pinch rollers 61 and moved or warped upward, and the storage medium supported on the support region 112 is damaged by its contact with the conveyor roller 60.

In a construction in which the pinch rollers 6 are provided on an upper side, and the conveyor roller 60 is provided on a lower side as in an eighth modification which will be described below, the supporters 55 supporting the pinch rollers 61B corresponding to the support region 112 of the media tray 110 can be moved upward by the distance D3 to prevent a contact between the storage medium and the pinch rollers 61B.

In the present embodiment, the third upper guide member 103 can be moved easily by moving the lever 90 from the outside of the MFP 10.

First Modification

The inclined faces 141A and the inclined faces 141B may be provided at different positions in the front and rear direction 8. In this construction, the inclined faces 141A are held in contact with the respective contact portions 72 in a state in which the third upper guide member 103 is located in a first area extending between the third position and the fourth position, and the inclined faces 141B are held in contact with the respective contact portions 72 in a state in which the third upper guide member 103 is located in a second area different from the first area and extending between the third position and the fourth position.

In a case where the inclined faces 141A are provided in front of the inclined faces 141B, for example, when the third upper guide member 103 is moved from the third position to the fourth position, the contact portions 72 provided on the protrusions 52A are first brought into contact with the respective inclined faces 141A. When the contact portions 72 are slid on the respective inclined faces 141A, the supporters 55 including the respective protrusions 52A and the pinch rollers 61A supported by the supporters 55 are moved downward, so that the contact portions 72 provided on the respective protrusions 52B are brought into contact with the respective inclined faces 141B. When the contact portions 72 are slid on the respective inclined faces 141B, the supporters 55 including the respective protrusions 52B and the pinch rollers 61B supported by the supporters 55 are moved downward. It is noted that the first area and the second area may overlap each other.

In this first modification, the inclined faces 141A and the inclined faces 141B are brought into contact with the respective contact portions 72 at different timings when the third upper guide member 103 is moved between the third position and the fourth position. This construction can distribute a load imposed on the third upper guide member 103 from the contact portions 72 when the third upper guide member 103 is moved. Even in the case where the first area and the second area overlap each other, the first area and the second area are displaced from each other. Thus, the timing when the inclined faces 141A receive the maximum loads from the respective contact portions 72 and the timing when the inclined faces

141B receive the maximum loads from the respective contact portions 72 can be made different from each other. Therefore, it is possible to reduce the maximum load imposed on the third upper guide member 103 from the contact portions 72 when the third upper guide member 103 is moved.

Second Modification

The inclination angle of the inclined faces 141A and the inclination angle of the inclined faces 141B may be equal to each other. In this construction, the length of the inclined faces 141B in a direction of their inclination is made longer than that of the inclined faces 141A in a direction of their inclination. Accordingly, even when the inclined faces 141A and the inclined faces 141B have the same inclination angle, the supporters 55 can be moved by a longer distance in the up and down direction 7 by the inclined faces 141B than by the inclined faces 141A.

Third Modification

In the above-described embodiment, the guide portion 140 includes the inclined faces 141 formed in the inner space of the third upper guide member 103, and the contact portions 72 provided on the distal ends of the protrusions 52 protruding downward from the respective supporters 55 are brought into contact with the respective inclined faces 141 from a lower side of the inclined faces 141. However, the construction of the guide portion 140 is not limited to the above-described construction as long as the guide portion 140 is brought into contact with the supporters 55 to move them from the first position to the second position when the third upper guide member 103 is moved from the third position to the fourth position as in the above-described embodiment.

For example, the MFP may be configured such that each of the supporters 55 has an inclined face inclining with respect to the front and rear direction 8 such that a front portion thereof is located above a rear portion thereof, and the third upper guide member 103 has protrusions protruding upward. when the third upper guide member 103 is moved from the third position to the fourth position, the protrusions may be brought into contact with the inclined faces from a lower side thereof and slid in a front upward direction relative to the inclined faces to move each supporter 55 from the first position to the second position.

Fourth Modification

While the reversible roller pair 45 does not nip the media tray 110 in the above-described embodiment, the reversible roller pair 45 may also be configured to nip the media tray 110 like the conveyor roller pair 59 and the output roller pair 44.

Fifth Modification

While the pinch rollers 61A are arranged on the opposite side portions in the right and left direction 9, and the pinch rollers 61B are arranged on the central portion in the right and left direction 9 in the above-described embodiment, the pinch rollers 61 may be arranged in a different configuration. For example, all the pinch rollers 61 may be configured like the pinch rollers 61A. That is, all the pinch rollers 61 may be moved downward by the distance D4.

Sixth Modification

The direction of movement of the third upper guide member 103 is not limited to the front and rear direction 8 as long as the direction intersects the direction of movement of the supporters 55. For example, the third upper guide member 103 may be moved in a direction inclining with respect to the front and rear direction 8.

Seventh Modification

While the third upper guide member 103 is movable in the above-described embodiment, the second lower guide member 104 may be movable between a third position at which the second lower guide member 104 is spaced apart from the third upper guide member 103 at a particular distance and a fourth position at which the second lower guide member 104 is spaced apart from the third upper guide member 103 at a distance smaller than the particular distance. In this configuration, for example, the MFP is configured such that the second lower guide member 104 includes the guide portion 140, and the fourth position is located at a rear of the third position.

Eighth Modification

While the conveyor roller 60 is provided above the pinch rollers 61 in the conveyor roller pair 59 in the above-described embodiment, the pinch rollers 61 may be provided above the conveyor roller 60. In this configuration, movement of the upper pinch rollers 61 switches the state of the conveyor roller pair 59. Also, while the movements of the lower output rollers 62 and the lower reversible roller 67 respectively switch the states of the output roller pair 44 and the reversible roller pair 45 in the above-described embodiment, movements of the upper spurs 63, 68 may respectively switch the states of the output roller pair 44 and the reversible roller pair 45.

Ninth Modification

The present invention is applied to the printing section 11 in the above-described embodiment but may be applied to any device other than the printing section 11 such as a scanner as long as the device can convey the recording sheet 12 or both of the recording sheet 12 and the media tray 110.

What is claimed is:

1. A conveying device, comprising:

a first roller disposed to a first conveyance path;

at least one second roller disposed to the first conveyance path and opposed to the first roller;

at least one roller holder supporting the at least one second roller and movable between a first position at which the at least one second roller is in contact with the first roller and a second position at which the at least one second roller is spaced apart from the first roller;

a first guide member comprising a guide face defining a part of a second conveyance path merged with the first conveyance path; and a second guide member opposed to the first guide member and comprising another guide face defining a part of the second conveyance path, wherein the first guide member is movable between a third position at which the first guide member is spaced apart from the second guide member at a predetermined distance and a fourth position at which a distance between the first guide member and the second guide member is less than the predetermined distance, the first guide member comprising a guide portion configured to contact the at least one roller holder to move the at least one roller holder from the first position to the second position in response to movement of the first guide member from the third position to the fourth position.

2. The conveying device according to claim 1, further comprising a frame formed of metal and supporting the at least one roller holder, wherein the first guide member is configured to move from the third position to the fourth position in a state in which the first guide member is kept in contact with the frame.

3. The conveying device according to claim 1, wherein the first guide member is movable in an intersecting direction which intersects a direction of movement of the at least one roller holder between the first position and the second position, wherein the at least one roller holder comprises: a projection projecting toward the first guide member; and a contact portion projecting from the projection in a direction which intersects a direction in which the projection projects, and wherein the guide portion of the first guide member comprises an inclined portion inclining with respect to the intersecting direction so as to be nearer to the at least one second roller at a portion of the inclined portion near the fourth position than at a portion of the inclined portion near the third position, and the inclined portion is contactable with the contact portion of the at least one roller holder.

4. The conveying device according to claim 3, wherein the inclined portion of the guide portion of the first guide member is configured to move relative to the contact portion in a state in which the inclined portion is kept in contact with the contact portion, when the first guide member moves between the third position and the fourth position.

5. The conveying device according to claim 3, wherein the at least one roller holder comprises a plurality of roller holders arranged in an axial direction of the at least one second roller, wherein the plurality of roller holders comprise: a first roller holder and a second roller holder, and wherein the inclined portion of the guide portion of the first guide member comprises: a first inclined portion configured to contact a contact portion of the first roller holder to move the first roller holder by a first distance; and a second inclined portion configured to contact a contact portion of the second roller holder to move the second roller holder by a second distance which is greater than the first distance.

6. The conveying device according to claim 5, wherein the first roller and the at least one second roller are configured to convey a tray in a state in which the first guide member is located at the fourth position, and the tray is configured to support a medium on a support region of the tray, wherein the at least one second roller comprises a plurality of second rollers, wherein the first inclined portion is configured to move, by the first distance, the first roller holder which supports at least one of the plurality of second rollers which corresponds to a portion of the tray outside the support region in the axial direction, wherein the second inclined portion is configured to move, by the second distance, the second roller holder which supports at least one of the plurality of second rollers which corresponds to the support region of the tray, and wherein the first distance is less than or equal to a thickness of the tray, and the second distance is greater than the thickness of the tray.

7. The conveying device according to claim 5, wherein the first inclined portion is held in contact with the contact portion of the first roller holder in a state in which the first guide member is located in a first area that is located between the third position and the fourth position, and wherein the second inclined portion is held in contact with the contact portion of the second roller holder in a state in which the first guide member is located in a second area that is different from the first area and located between the third position and the fourth position.

8. The conveying device according to claim 1, further comprising a lever connected to the first guide member, at least a portion of the lever being exposed to an outside of the conveying device, and the lever being movable between (i) a fifth position at which the first guide member is located at the third position and (ii) a sixth position at which the first guide member is located at the fourth position.

9. The conveying device according to claim 1, further comprising an urging member for urging the at least one roller holder toward the first roller.

10. The conveying device according to claim 1, further comprising a recording unit disposed along the first conveying path and configured to record an image on a sheet, wherein the first guide member located at the third position and the second guide member are configured to guide the sheet having the image recorded thereon along the second conveyance path back toward the first conveying path.

* * * * *